(12) United States Patent
Kamikawa et al.

(10) Patent No.: US 9,416,223 B2
(45) Date of Patent: Aug. 16, 2016

(54) DEVICE AND METHOD FOR PRODUCING POLYESTER

(71) Applicant: HITACHI, LTD., Tokyo (JP)

(72) Inventors: Masayuki Kamikawa, Tokyo (JP); Toshiaki Matsuo, Tokyo (JP); Takeyuki Kondo, Tokyo (JP); Yasunari Sase, Tokyo (JP); Masashi Tanto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/441,538

(22) PCT Filed: Nov. 7, 2013

(86) PCT No.: PCT/JP2013/080072
§ 371 (c)(1),
(2) Date: May 8, 2015

(87) PCT Pub. No.: WO2014/073589
PCT Pub. Date: May 15, 2014

(65) Prior Publication Data
US 2015/0299385 A1     Oct. 22, 2015

(30) Foreign Application Priority Data
Nov. 9, 2012   (JP) ................ 2012-247591

(51) Int. Cl.
| C08G 64/00 | (2006.01) |
| C08G 63/78 | (2006.01) |
| B01J 19/24 | (2006.01) |
| C08G 63/183 | (2006.01) |
| B01J 19/18 | (2006.01) |
| B01J 19/20 | (2006.01) |
| C08G 63/02 | (2006.01) |

(52) U.S. Cl.
CPC ............. *C08G 63/78* (2013.01); *B01J 19/1862* (2013.01); *B01J 19/20* (2013.01); *B01J 19/245* (2013.01); *C08G 63/183* (2013.01); *C08G 63/785* (2013.01); *B01J 2219/00006* (2013.01); *B01J 2219/00083* (2013.01); *B01J 2219/00103* (2013.01); *B01J 2219/24* (2013.01); *Y02P 20/582* (2015.11)

(58) Field of Classification Search
CPC ............................ C08G 64/307; C08G 64/06
USPC ................... 528/271, 272; 422/133, 134, 135
See application file for complete search history.

(56) References Cited

U.S. PATENT DOCUMENTS

2005/0239999 A1 * 10/2005 Okubo ................ C08G 63/785
528/272

FOREIGN PATENT DOCUMENTS

JP     3812564 B2    8/2006

* cited by examiner

Primary Examiner — Terressa Boykin
(74) Attorney, Agent, or Firm — Oliff PLC

(57) ABSTRACT

Provided are a device and a method for efficiently producing a polyester by using 1,4-butanediol as a starting material. The device for producing a polyester includes: a preparation tank (4) for starting material slurry; a storage tank (6) for starting material slurry; an esterification reactor (9); an initial polycondensation reactor (11); a middle polycondensation reactor (13); and a final polycondensation reactor (15). An exhaust system for each of the initial, middle, and final polycondensation reactors includes a wet condenser (17, 23, or 31) using a liquid containing 1,4-butanediol as a coolant; and a hot well (22, 30, or 38) connected to the corresponding wet condenser. Herein, process scattered substances scattering with exhaust are collected, and hydrolyzed in the hot well, so as to be returned to the esterification step. This allows the polyester to be efficiently produced.

15 Claims, 12 Drawing Sheets

DEVICE AND METHOD FOR PRODUCING POLYESTER

TECHNICAL FIELD

The present invention relates to a device and a method for producing a polyester.

BACKGROUND ART 1,4-Butanediol is a glycol that can be used to produce polybutylene succinate by polycondensation with succinic acid or a derivative thereof. Further, 1,4-butanediol can be used to produce polybutylene terephthalate by polycondensation with terephthalic acid or a derivative thereof; and also to produce poly(butylene adipate/terephthalate) by polycondensation with adipic acid or a derivative thereof and terephthalic acid or a derivative thereof.

A known method for synthesizing polybutylene succinate includes the steps of: causing an esterification reaction of succinic acid or a derivative thereof with 1,4-butanediol; and subsequently heating and stirring the resulting ester in vacuo to carry out a transesterification (i.e., polycondensation) reaction. During the esterification step, a carboxyl group of succinic acid or a terminal group of a derivative thereof is subjected to an esterification reaction with a hydroxyl group of 1,4-butanediol at a predetermined temperature and pressure so as to produce an oligomer having a terminal hydroxyl group.

In the polycondensation step, transesterification proceeds under the presence of a catalyst, and 1,4-butanediol contained as a byproduct is devolatilized under a reduced pressure. This process allows the oligomer to be converted into a polymer with high viscosity. Because of this, it is necessary for the above process to keep the reaction system at a high temperature and satisfy a condition of the reduced pressure so that a degree of vacuum is more increased as the reaction proceeds to latter stages. At this time, in order to distill away a desorption component present on the surface of the reactant, mechanical stirring should be performed, so as to sufficiently increase an evaporating surface area of the byproduct and a rate of migration (i.e., a surface renewal rate) of the byproduct from the inside of the reaction liquid to the evaporating surface.

Likewise, the polybutylene terephthalate and the poly(butylene adipate/terephthalate) can be synthesized by esterification, followed by polycondensation.

In the polycondensation step, a molecular chain of the polymer is elongated via transesterification caused by heating and stirring of the ester under reduced pressure. At this time, 1,4-butanediol contained as a byproduct is devolatilized and removed under reduced pressure. This facilitates the reaction to proceed. However, the above process has a drawback of preventing the transesterification from proceeding as described below. That is, a low-molecular-weight oligomer scatters accompanied by 1-4-butanediol. The scattering oligomer attaches to a pipe of an exhaust system and an inner wall of a condenser to occlude the exhaust system.

Consequently, this occlusion deteriorates a degree of vacuum in a polycondensation reactor and prevents the progress of the transesterification.

As a solution to the above drawbacks, widely known is a method (Patent Literature 1) including: providing an ejector driven by 1,4-butanediol vapor and a condenser arranged at a downstream of the ejector of an exhaust system in a polycondensation step; and further providing a hot well tank connected to the condenser.

The method according to Patent Literature 1 makes it possible to wash away scattered substances in the exhaust system generated in the reaction process. However, 1,4-butanediol, which has a melting point of 20° C., is readily solidified under, for example, reduced pressure at room temperature. Therefore, if a suitable temperature condition is not maintained, 1,4-butanediol injected via the ejector turns to solidified, so that this may instead promote occlusion of the exhaust system. In addition, the technology according to Patent Literature 1 primarily aims at separating a solvent (e.g., THF) included in the exhaust system. Accordingly, although the scattered substances generated in process are collected in a hot well tank, those substances are not to be recycled. Hence, a product yield based on the starting material cannot be improved.

CITATION LIST

Patent Literatures

Patent Literature 1: Japanese Patent Publication No. 3812564B

SUMMARY OF THE INVENTION

Problems to be Solved by the Invention

The present invention has been developed in light of the above drawbacks. An object of the present invention is to prevent occlusion of an exhaust system from being caused by scattered substances contained in exhaust and generated during the manufacture of an aliphatic polyester (e.g., polybutylene succinate, polybutylene terephthalate, polybutylene adipate/terephthalate) performed using 1,4-butanediol as a starting material. In this regards, an additional object of the present invention is to efficiently collect and recycle the scattered substances generated in process as a starting material, so as to improve a production yield based on the starting material through the entire process.

Means to Solve the Problems

The present inventors have conducted intensive research and found a solution to the above problems by deploying an exhaust system including a wet condenser and a hot well set at predetermined temperatures, respectively. As a result, the present inventors have completed the present invention. Specifically, a device for producing a polyester in an aspect of the present invention includes: an esterification reactor for producing an ester of 1,4-butanediol; a polycondensation reactor connected to the esterification reactor; and an exhaust system of the polycondensation reactor. Herein, the exhaust system includes: a wet condenser using a 1,4-butanediol-containing coolant kept from 20° C. to 100° C.; and a hot well connected to the wet condense. A liquid temperature in the hot well is kept from 20° C. to 100° C.

Advantageous Effects of the Invention

The device and method for producing a polyester according to embodiments of the present invention prevents occlusion of an exhaust system from being caused by scattered substances generated in process during manufacture of a polyester. In addition, the scattered substances generated in process are efficiency collected and recycled as a starting material. The above increases a production yield based on the starting material through the entire process. Note that objectives, constructions, and advantageous effects other than the above described matters will be clearly described in the following embodiments hereinafter.

EMBODIMENTS FOR CARRYING OUT THE INVENTION

Hereinafter, the present invention will be described in detail referring to the following embodiments. However, the scope of the present invention is not limited to those embodiments.

Figure 1:
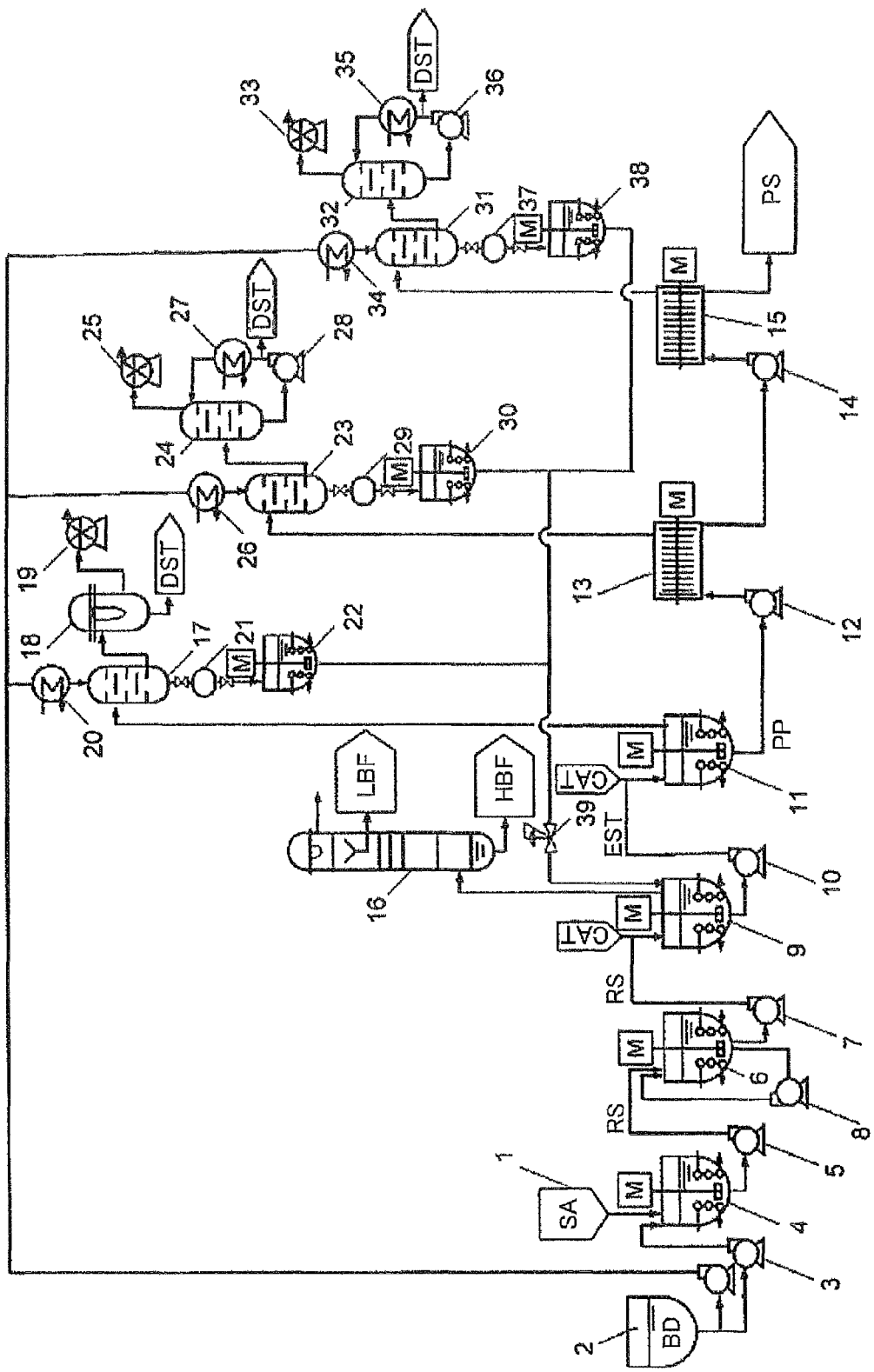
FIG. 1 illustrates a device for producing a polyester according to an embodiment of the present invention.

FIG. 1 illustrates a device for producing a polyester according to an embodiment of the present invention. Here, for convenience, this device is will be described assuming a case of producing polybutylene succinate. Note that when polybutylene terephthalate is produced, the same device as described below can be used for producing a polymer except that terephthalic acid is used as a starting material instead of succinic acid.

Polybutylene succinate is produced by a device shown in FIG. 1. However, the present invention is not limited to this device, and another device can be used without departing from the scope of the present invention.

A device for producing a polyester of the present embodiment primarily includes: a succinic acid supplier 1; a 1,4-butanediol supplier 2; a preparation tank 4 for starting material slurry; a storage tank 6 for starting material slurry; a liquid transfer unit 8; an esterification reactor 9; an initial polycondensation reactor 11; a middle polycondensation reactor 13; and a final polycondensation reactor 15.

In the preparation tank 4 for starting material slurry, succinic acid and 1,4-butanediol that are supplied from the succinic acid supplier 1 and the 1,4-butanediol supplier 2, respectively, are mixed to prepare starting material slurry. In the present invention, a small amount of a dicarboxylic acid other than succinic acid may be supplied to the preparation tank 4. Examples of the dicarboxylic acid other than the succinic acid include oxycarbonic acid (e.g., malic acid).

A supplied amount of the dicarboxylic acid other than succinic acid is from about 0.075 mol % to 0.125 mol % per succinic acid and preferably about 0.1 mol %. A supplied amount of 1,4-butanediol varies depending on physical properties of the desired polybutylene succinate, but is usually from about 1.02 mol to 1.5 mol per 1 mol of succinic acid and preferably from about 1.03 mol to 1.2 mol. In order to impart fluidity to the starting material slurry, the preparation tank 4 may be heated. The heating temperature is set in a range from 25° C. to 150° C. and preferably from 50° C. to 100° C.

The storage tank 6 stores the starting material slurry supplied from the preparation tank 4, and the starting material slurry is then sent to the esterification reactor 9. In order to impart fluidity of the starting material slurry, the storage tank 6 may be heated. The heating temperature is set in a range from 25° C. to 150° C. and preferably from 50° C. to 100° C. In order to prevent sedimentation of succinic acid contained in the starting material slurry, the storage tank 6 may use the liquid transfer unit 8 installed partway through a circulation line independently arranged from a liquid transfer line used for transferring the starting material slurry to the esterification reactor 9.

By doing so, the starting material slurry may be circulated at a flow rate equal to or more than a sedimentation rate of succinic acid. As such a liquid transfer unit, a device usually used in the art can be used. Examples include a gear pump and a plunger pump.

In the esterification reactor 9, the starting material slurry supplied from the storage tank 6 is subjected to an esterification reaction at a predetermined temperature and pressure to produce an ester of succinic acid and 1,4-butanediol. The reaction temperature in the esterification reactor 9 is set in a range from 140° C. to 250° C. and preferably from about 145° C. to 245° C. Herein, the reaction rate is low and impractical, if the reaction temperature is lower than 140° C. Further, the produced ester may be thermally decomposed, if the reaction temperature is more than 250° C. Regarding the pressure, the reaction is usually carried out at ordinary pressure.

The esterification reaction proceeds until the acid value of the ester reaches 30 or less, preferably 15 or less, and more preferably 10 or less. In addition, the esterification reaction can be conducted under the presence of a catalyst. Conventionally known catalysts can be used as the above catalyst. Examples of the catalyst include catalysts made of any of metallic compounds or metals selected from the group consisting of Groups IA, IIIA, IV, IIB, and VA in the periodic table. Among them, preferred are tin-based compounds (e.g., tin octylate) or antimony-based compounds (e.g., antimony trioxide). A usage amount of the catalyst is from 1000 ppm to 3000 ppm per succinic acid and preferably from 1500 ppm to 2500 ppm.

The esterification reactor 9 may be heated by a method usually used in the art. Examples include: a method for providing a heat transfer medium-containing jacket around the periphery of the reactor and heating a reaction solution by using heat conducted through the wall of the reactor; and a method for heating the reactor by using heat conducted through a heat-transfer pipe (or coil) inside the reactor. Those methods may be used singly or may be combined. As the esterification reactor 9, a reaction apparatus usually used for manufacturing a polyester by esterification can be used. Examples of such a reaction apparatus include a vertical type agitation tank with a vertical type rotation shaft having a stirring blade (e.g., a paddle blade, a helical ribbon blade).

Figure 2:
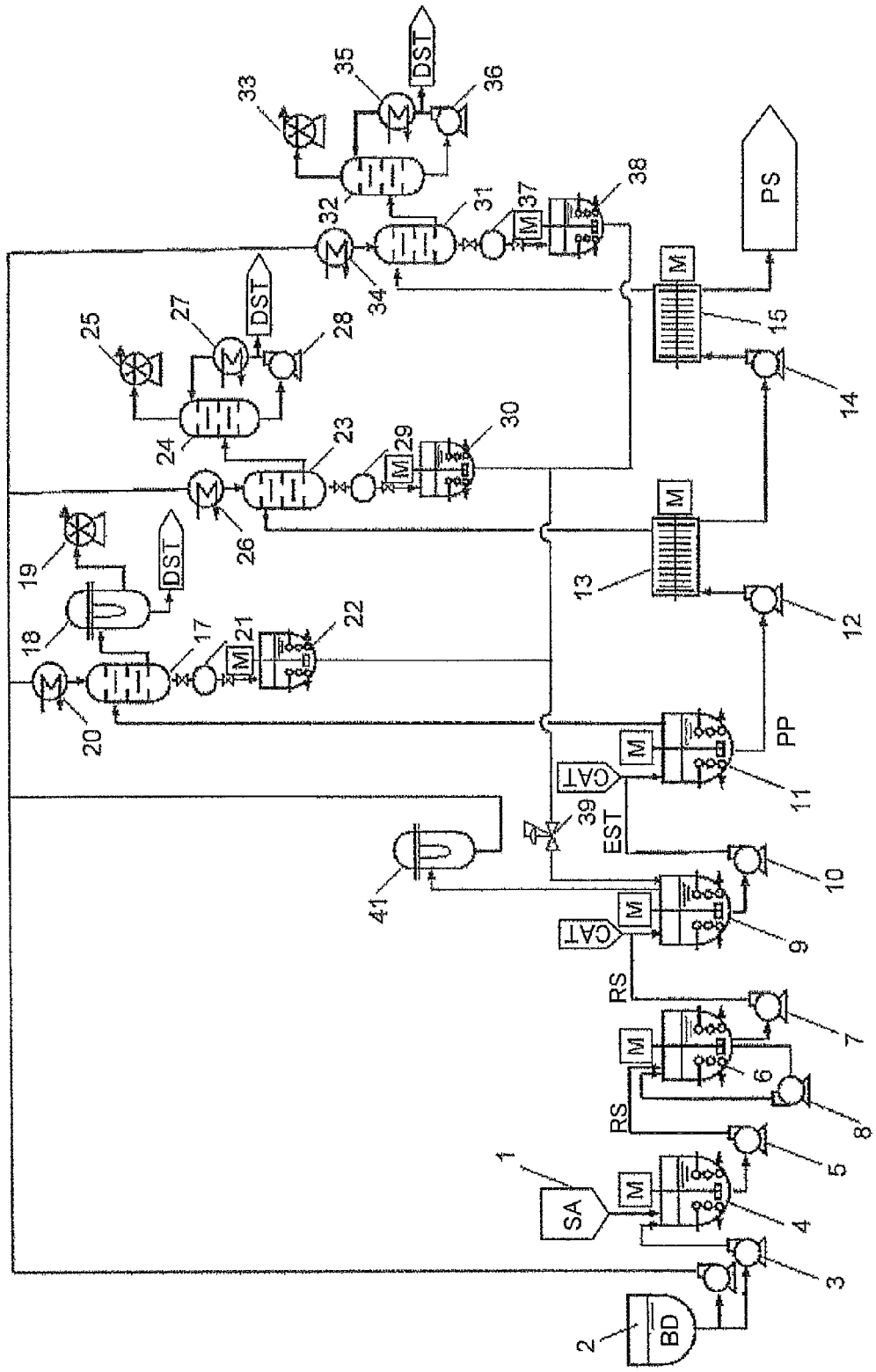
FIG. 2 illustrates a device for producing a polyester according to an embodiment of the present invention.

Distillate discharged from the esterification reactor 9 may be made to flow into a distillation tower 16 installed over the esterification reactor 9. Then, 1,4-butanediol contained in a high-boiling-point fraction may be collected, and the 1,4-butanediol thus collected may be returned to the preparation tank 4 to be recycled. Alternatively, as shown in FIG. 2, the distillation tower 16 may be omitted and a condenser 41 may be installed. The distillate may be made to flow into either of the wet condenser and a hot well or both.

In the initial polycondensation reactor 11, the ester supplied from the esterification reactor 9 is subjected to a polycondensation reaction at a predetermined temperature and pressure to produce a prepolymer having a terminal hydroxyl group. A reaction temperature in the initial polycondensation reactor 11 is set in a range from about 140° C. to 250° C. and preferably from about 145° C. to 245° C. A reaction rate is low and impractical, if the reaction temperature is lower than 140° C. The produced prepolymer may be thermally decomposed, if the reaction temperature is more than 250° C. Regarding the pressure, the reaction is usually conducted at a low pressure (e.g., from about 5 Torr to 200 Torr). The polycondensation reaction is usually carried out under the presence of a catalyst. Catalysts may be used singly or two or more of them may be combined.

Examples of the catalysts include known catalysts widely used for transesterification. The examples of the catalysts include metallic compounds containing a metal (e.g., Li, Mg, Ca, Ba, La, Ce, Ti, Zr, Hf, V, Mn, Fe, Co, Ir, Ni, Zn, Ge, Sn). Those examples include: organic metal compounds (e.g., an organic acid salt, metal alkoxide, metal complex (e.g., acetylacetonate)); and inorganic metal compounds (e.g., a metal oxide, metal hydroxide, metal carbonate, metal phosphate, metal sulfate, metal nitrate, and metal chloride). Among the metal compound catalysts, preferred is a titanium compound. More preferred is an organic titanium compound (e.g., titanium tetraethoxide, titanium tetraisopropoxide, titanium tetrabutoxide). A usage amount of the metallic compound catalyst is from about 0.005 mol to 1 mol and preferably from about 0.01 mol to 0.3 mol per 100 mol of ester.

The initial polycondensation reactor 11 may be heated by a method usually used in the art. Examples include: a method for providing a heat transfer medium-containing jacket around the periphery of the reactor and heating a reaction solution by using heat conducted through a wall of the reactor; and a method for heating the reactor by using heat conducted through a heat-transfer pipe (or coil) inside the reactor. Those methods may be used singly or may be combined. As the initial polycondensation reactor 11, a reaction apparatus usually used for manufacturing a polyester by polycondensation can be used. Examples of such a reaction apparatus include a vertical type agitation tank with a vertical type rotation shaft having a stirring blade (e.g., a paddle blade, a helical ribbon blade).

A distillate discharged from the initial polycondensation reactor 11 may be cooled and condensed by a wet condenser 17. Next, the distillate may be made to flow into the distillation tower 16 installed over the esterification reactor 9. Then, 1,4-butanediol contained in a high-boiling-point fraction may be collected. The collected 1,4-butanediol may be returned to the preparation tank 4 to be recycled. Further, water contained in the distillate may be used for hydrolysis of process scattered substances, which is discharged during the polycondensation step. For this purpose, a low-boiling-point fraction discharged from the distillation tower 16 may be made to flow into either of the wet condenser and the hot well or both. Alternatively, as shown in FIG. 2, the distillation tower 16 may be omitted and the condenser 41 may be installed so that the distillate may be made to flow into either of the wet condenser and the hot well or both.

In the middle polycondensation reactor 13, the prepolymer supplied from the initial polycondensation reactor 11 is subjected to a polycondensation reaction at a predetermined temperature and pressure to produce polybutylene succinate. The reaction temperature in the middle polycondensation reactor 13 is set in a range from 235° C. to 245° C. and preferably 240° C. The reaction rate is low and impractical, if the reaction temperature is lower than 235° C. Further, polybutylene succinate may be thermally decomposed, if the reaction temperature is higher than 245° C. The reaction time ranges from 0.75 hour to 1.25 hours and is preferably 1 hour. The pressure ranges from 3 Torr to 5 Torr and is preferably 4 Torr.

The middle polycondensation reactor 13 includes: at least a reactor; a prepolymer inlet; and a polybutylene succinate outlet. In addition, the reactor includes an ordinary thermometer. Examples of the reactor that can be used include, but are not particularly limited to, a vertical type reactor, a horizontal type reactor, and a tank type reactor. Two or more reactors may be arranged in series, or only one reactor may be used. Examples of the stirring blade that can be used include a grid blade, wheel blade, glasses blade, hybrid blade, paddle blade, turbine blade, anchor blade, double motion blade, and helical ribbon blade.

The reactor may be heated by a method usually used in the art. Examples include: a method for providing a heat transfer medium-containing jacket around a periphery of the reactor and heating a reaction solution by using heat conducted through a wall of the reactor; and a method for heating the reactor by using heat conducted through a heat-transfer pipe (or coil) inside the reactor. Those methods may be used singly or may be combined.

A distillate discharged from the middle polycondensation reactor 13 may be cooled and condensed by a wet condenser 23. The distillate may be made to flow into the distillation tower 16 installed over the esterification reactor 9. Then, 1,4-butanediol contained in a high-boiling-point fraction may be collected and returned to the preparation tank 4 to be recycled. Alternatively, the distillation tower 16 may be omitted and the condenser 41 may be installed. The distillate may be made to flow into either of the wet condenser and the hot well or both.

In the final polycondensation reactor 15, the polybutylene succinate supplied from the middle polycondensation reactor 13 is subjected to a polycondensation reaction at a predetermined temperature and pressure. The polycondensation reaction increases a molecular weight of the polybutylene succinate. The reaction temperature in the final polycondensation reactor 15 is set in a range from about 245° C. to 255° C. and preferably about 250° C. The reaction rate is low and impractical, if the reaction temperature is 245° C. or less which is lower than the temperature of the middle polycondensation step. In addition, the polybutylene succinate may be thermally decomposed, if the reaction temperature is more than 255° C. The pressure ranges from 0.5 Torr to 1.5 Torr and is preferably 1 Torr.

The final polycondensation reactor 15 includes: at least a reactor; a polybutylene succinate inlet; and a polybutylene succinate outlet. In addition, the reactor further includes an ordinary thermometer. Examples of the reactor that can be used include, but are not particularly limited to, a vertical type reactor, a horizontal type reactor, and a tank type reactor. Two or more reactors may be arranged in series, or only one reactor may be used. Examples of the stirring blade that can be used include a grid blade, wheel blade, glasses blade, hybrid blade, paddle blade, turbine blade, anchor blade, double motion blade, and helical ribbon blade.

The reactor may be heated by a method usually used in the art. Examples include: a method for providing a heat transfer medium-containing jacket around a periphery of the reactor and heating a reaction solution by using heat conducted through a wall of the reactor; and a method for heating the reactor by using heat conducted through a heat-transfer pipe (or coil) inside the reactor. Those methods may be used singly or may be combined.

A distillate discharged from the final polycondensation reactor 15 may be cooled and condensed by a wet condenser 31. The condensed distillate may be made to flow into the distillation tower 16 installed over the esterification reactor 9. Then, 1,4-butanediol contained in a high-boiling-point fraction may be collected and returned to the preparation tank 4 to be recycled. Alternatively, the distillation tower 16 may be omitted and the condenser 41 may be installed. The distillate may be made to flow into either of the wet condenser and the hot well or both.

Exhaust discharged from the initial polycondensation reactor 11, the middle polycondensation reactor 13, and the final polycondensation reactor 15 contains process scattered substances including, for example, 1,4-butanediol, a low-molecular-weight oligomer, water, and tetrahydrofuran (THF). The exhaust containing the process scattered substances is introduced into a wet condenser.

Exhaust systems of the initial polycondensation reactor 11, the middle polycondensation reactor 13, and the final polycondensation reactor 15 are connected to the wet condensers 17, 23, and 31, respectively. Exhaust discharged from each reactor or each indirect heat exchanger is introduced into each wet condenser. As used herein, a term of "wet condenser" means a condenser in which a flowing coolant directly contacts with flowing gas. Exhaust discharged from the initial polycondensation reactor 11, the middle polycondensation reactor 13, and the final polycondensation reactor 15 contains process scattered substances containing, for example, 1,4-butanediol, an oligomer of a cyclic oligomer, water, and tetrahydrofuran (THF).

Figure 3:
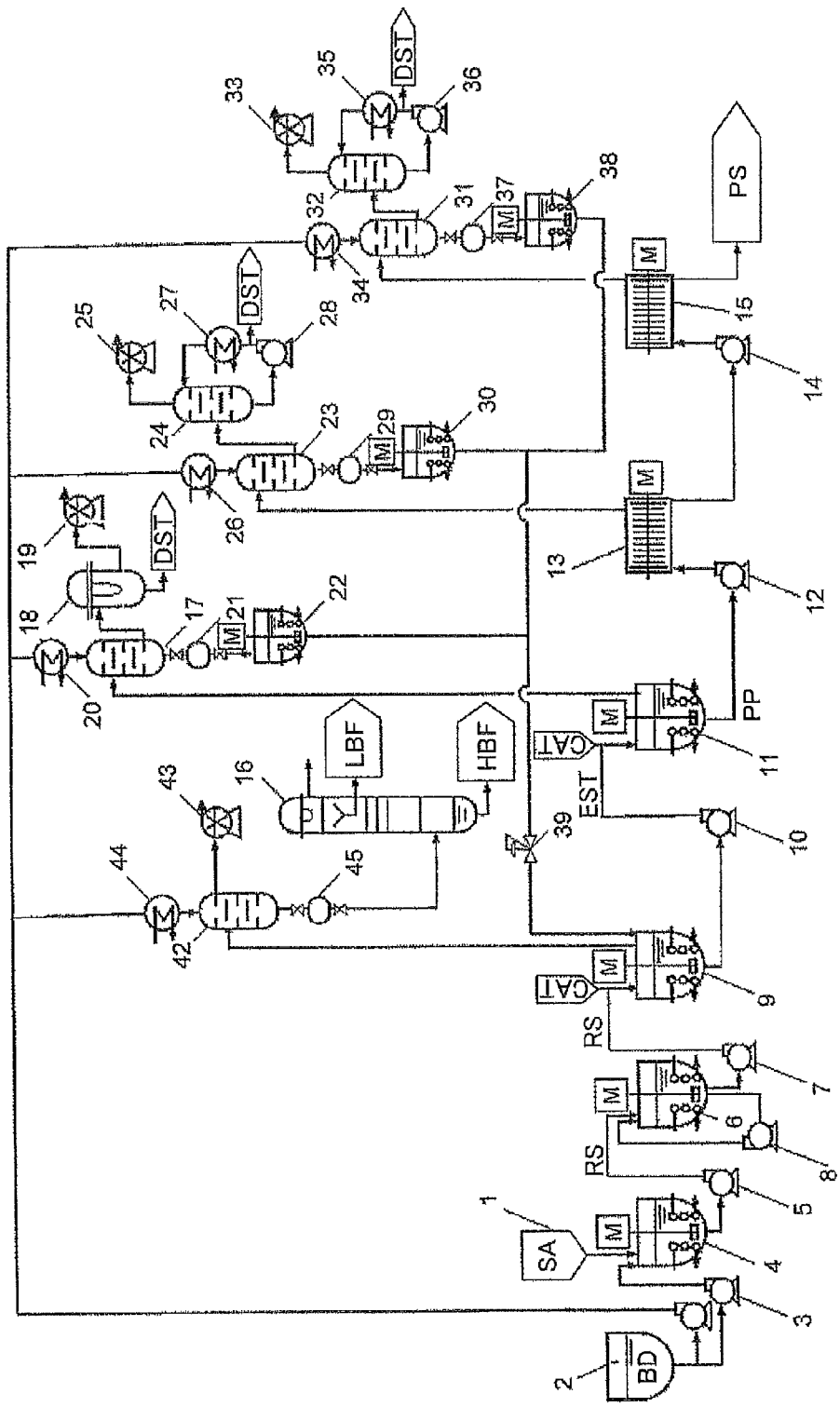
FIG. 3 illustrates a device for producing a polyester according to an embodiment of the present invention.

In each wet condenser, those process scattered substances contained in the exhaust are collected and then transferred to the below-described hot well. Next, the cyclic oligomer is hydrolyzed into a linear oligomer. Also, the high-molecular-weight oligomer is hydrolyzed into low-molecular-weight oligomers. Those oligomers are transferred to the esterification reactor 9 to be recycled as a starting material. In the device shown in FIG. 1, each of the initial polycondensation reactor 11, the middle polycondensation reactor 13, and the final polycondensation reactor 15 includes a wet condenser. However, the present embodiment is not limited to the above construction. For example, when the esterification reactor 9 is depressurized, an exhaust system of the esterification reactor 9 may have an additional wet condenser 42 as shown in FIG. 3.

In each wet condenser, a liquid containing 1,4-butanedol is used as a coolant. As the coolant, 1,4-butanediol used as a starting material may be used or a liquid containing 1,4-butanediol and water collected in the exhaust system during the esterification step may be used. In each wet condenser, the coolant whose temperature is adjusted using the indirect heat exchanger 20, 26, or 34 is circulated. By doing so, the process scattered substances contained in the exhaust are collected and dissolved. An adjusted temperature of the coolant ranges from about 20° C. to 100° C., which is equal to or higher than the melting point of 1,4-butanediol, and preferably from about 50° C. to 80° C.

Examples of the wet condenser according to the present invention include a stage-type wet condenser. In the wet condenser, one or more stages are provided; a liquid used as a coolant containing 1,4-butanediol is made to circulate and flow downward from an upper portion thereof to form a liquid film; and contact of the liquid film with exhaust enables process scattered substances to be dissolved and collected. Another example is a shower-type wet condenser. In the shower-type wet condenser, a shower nozzle is disposed at an upper portion; a liquid containing 1-4-butanediol used as a coolant is sprayed; and contact of the resulting liquid drops with exhaust enables process scattered substances to be dissolved and collected. Still another example is a wet condenser in which a stage-type and a shower-type condensers are combined. The stage-type condenser is disposed at an upper portion, and the shower type condenser is disposed at a lower portion. Any of the above wet condensers may be used.

Figure 4:
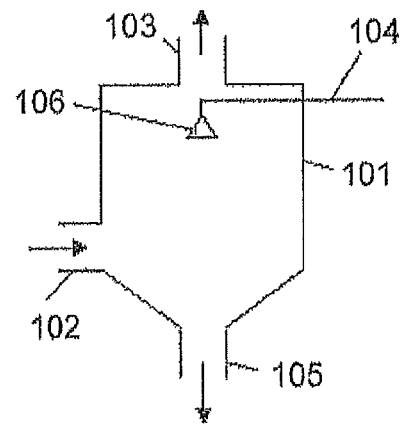
FIG. 4 is a diagram showing a shower-type wet condenser.
Figure 5:
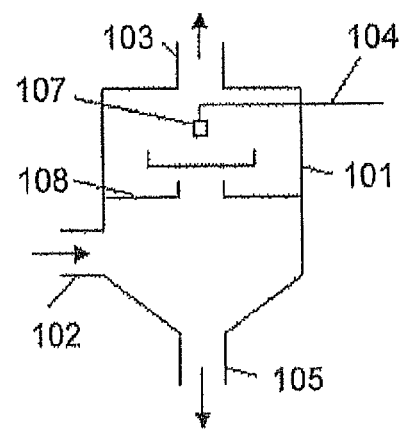
FIG. 5 is a diagram showing a stage-type wet condenser.
Figure 6:
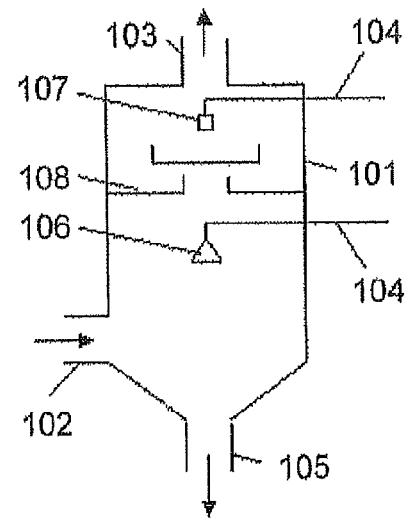
FIG. 6 is a diagram showing a wet condenser with a shower and a stage.

FIG. 4 outlines the shower-type wet condenser. FIG. 5 outlines the stage-type wet condenser. FIG. 6 outlines the wet condenser in which a stage-type and a shower-type condensers are combined. The wet condensers shown in FIGS. 4 to 6 include: a main body 101 of wet condenser; a gas inlet pipe 102; an exhaust pipe 103 for non-condensable gas; a coolant supply pipe 104; a condensate discharging pipe 105; a coolant supply nozzle 107; a coolant shower nozzle 106; and a stage 108.

Here, a condenser that collects and liquefies THF and water, etc., discharged from each wet condenser may be disposed downstream of each wet condenser.

Each wet condenser is connected to each hot well 22, 30, or 38 into which a drain liquid discharged from each wet condenser is introduced. The drain liquid contains the collected and dissolved process scattered substances and the coolant 1,4-butane diol. Examples of the above hot well that can be used include, but are not limited to, a tank-type hot well. In addition, over the hot well may be disposed a circulation cooler that liquefies 1,4-butanediol evaporated in the hot well to circulate the 1,4-butanediol through the hot well. In addition, a cooler that liquefies and collects water and THF evaporated in the hot well may be installed. The hot well has at least one stirring or heating unit, which can promote hydrolysis of process scattered substances contained in the drain liquid. The cyclic oligomer and/or the high-molecular-weight oligomer contained in the process scattered substances are hydrolyzed to produce linear low-molecular-weight oligomers while water contained in the drain liquid is consumed.

Here, the above construction is preferable. That is, when the resulting oligomers are returned to the esterification step, deterioration of the catalyst may be suppressed because the water has been consumed and almost removed. Further, if water is removed from the drain liquid at the hot well or downstream thereof, it is more preferable. The hot well may be kept at an ordinary pressure, or kept at a negative pressure so as to promote water evaporation. However, it should be noted that 1,4-butanediol and the oligomers may be vaporized under a highly vacuumed condition with a degree of vacuum of 1 Torr or less. Accordingly, the pressure is set preferably from 1 Torr to 760 Torr and more preferably from 100 Torr to 760 Torr. The heating temperature in the hot well is set in a range from 20° C. to 200° C. and preferably from 50° C. to 150° C.

Figure 7:
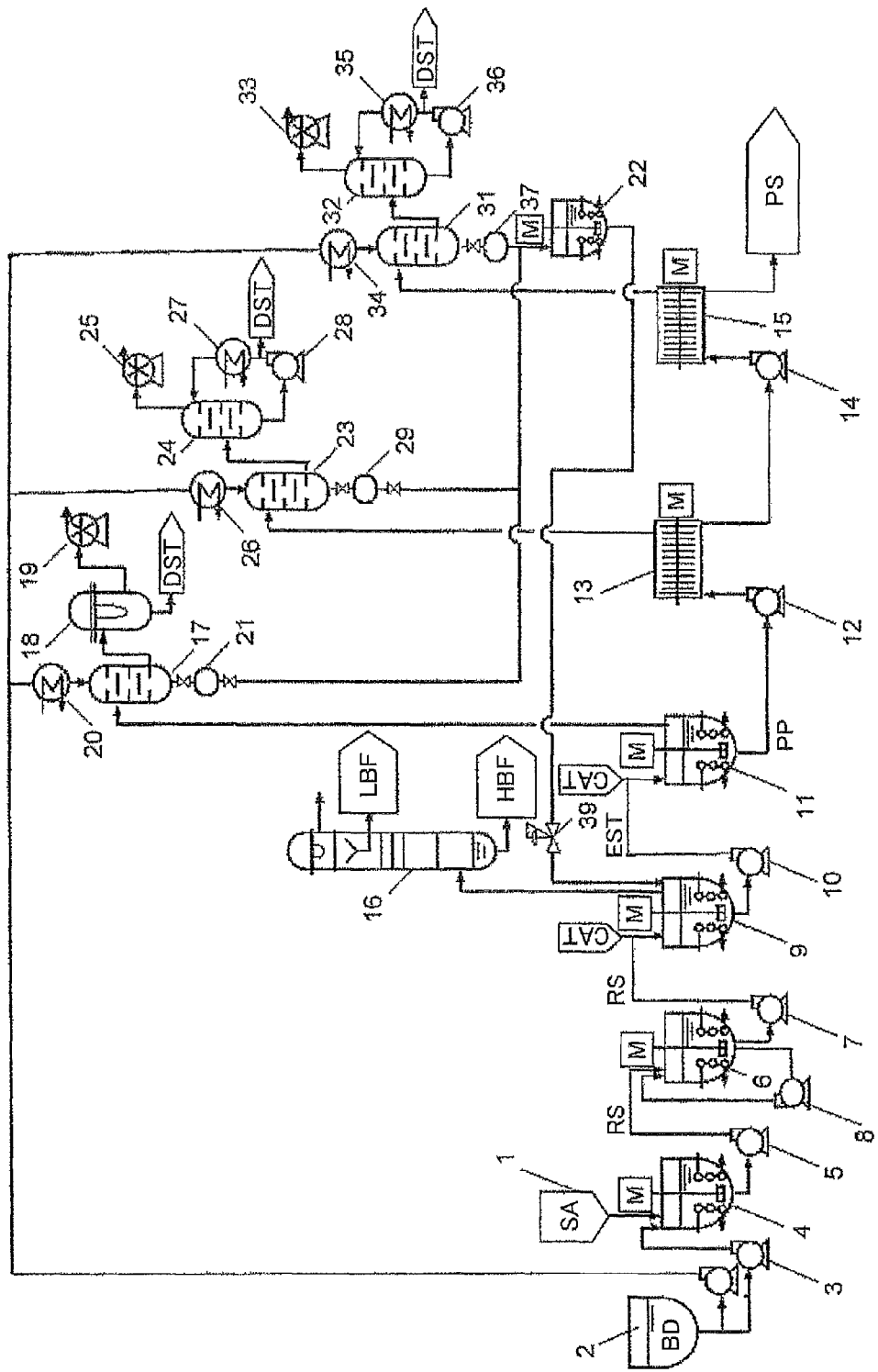
FIG. 7 illustrates a device for producing a polyester according to an embodiment of the present invention.
Figure 8:
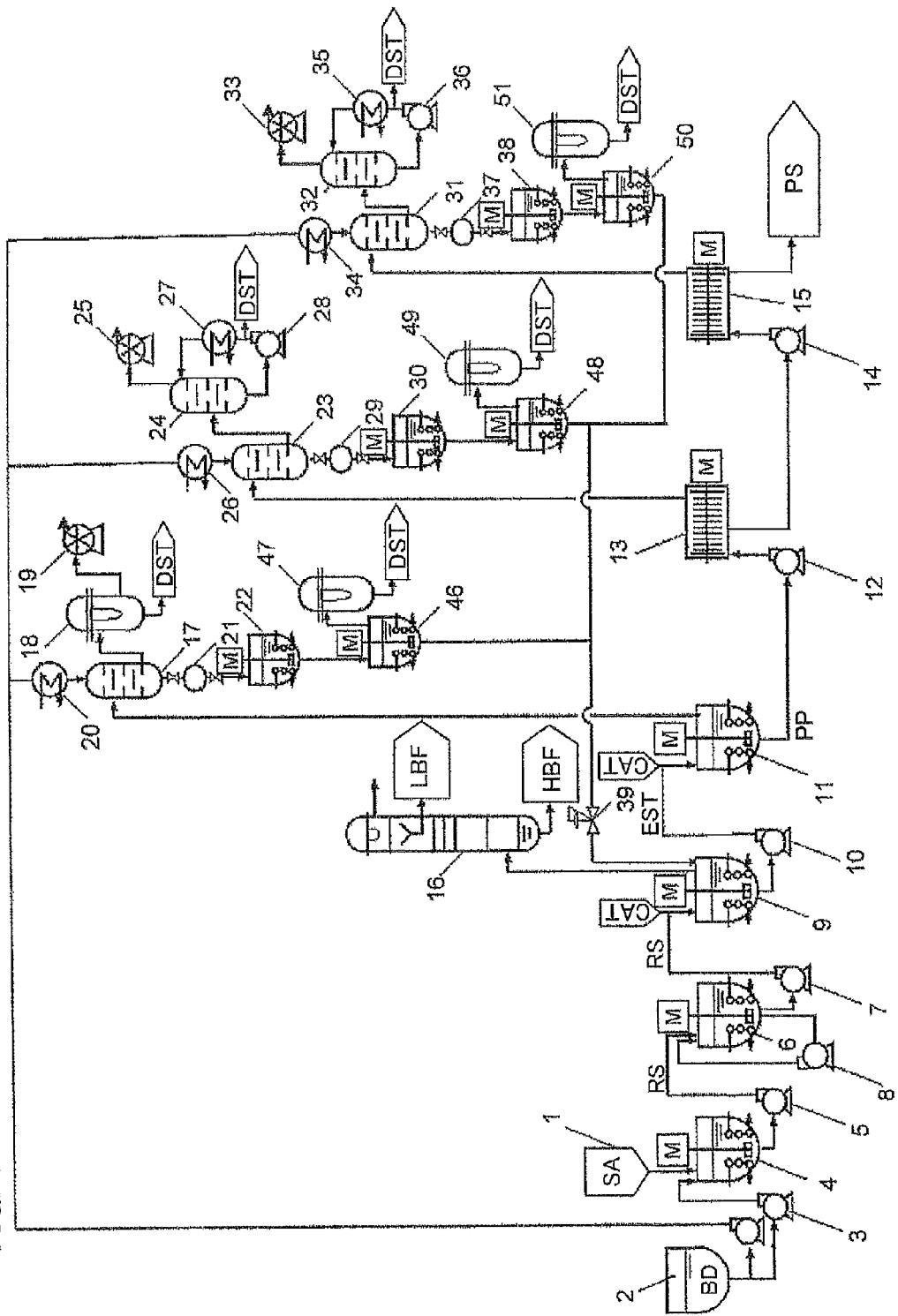
FIG. 8 illustrates a device for producing a polyester according to an embodiment of the present invention.

Further, as shown in FIG. 7, the drain liquid discharged from each wet condenser may be introduced in one hot well 22. Here, when the process scattered substances are insufficiently hydrolyzed in the hot well, a suitable amount of water may be added to the hot well. Alternatively, as shown in FIG. 8, the hot wells 22, 30, and 38 may be respectively connected to drain liquid tanks 46, 48, and 50 to remove water content contained in the drain liquid. The drain liquid whose contents have been hydrolyzed in the hot well is transferred to the esterification reactor 9.

The construction of combining the wet condenser that uses a liquid containing 1,4-butanediol as a coolant and the hot well has the following advantages when compared to a conventional combination of a condenser and an ejector using 1,4-butanediol. That is, water contained in the drain liquid is consumed by hydrolysis. Also, the cyclic oligomer and the high-molecular-weight oligomer, which are hardly subjected to a polycondensation reaction, contained in the process scattered substances are hydrolyzed to produce fresh low-molecular-weight oligomers. The resulting oligomers can be recycled to increase a production yield based on the starting material. This advantage leads to an improved synthetic efficiency in the entire process and a reduced running cost.

Further, water contained in the drain liquid that is returned to the esterification step, can be decreased or removed. This makes it possible to suppress deterioration of the catalyst in the esterification step. The above advantages lead to decrease in the catalyst usage, and improvement in a thermal stability of the polymer. Moreover, the process scattered substances are washed away by using a liquid containing 1,4-butanediol. Hence, the process scattered substances neither infiltrate into a unit (e.g., a vacuum pump) installed downstream of the wet condenser, nor deteriorate the unit.

Figure 9:
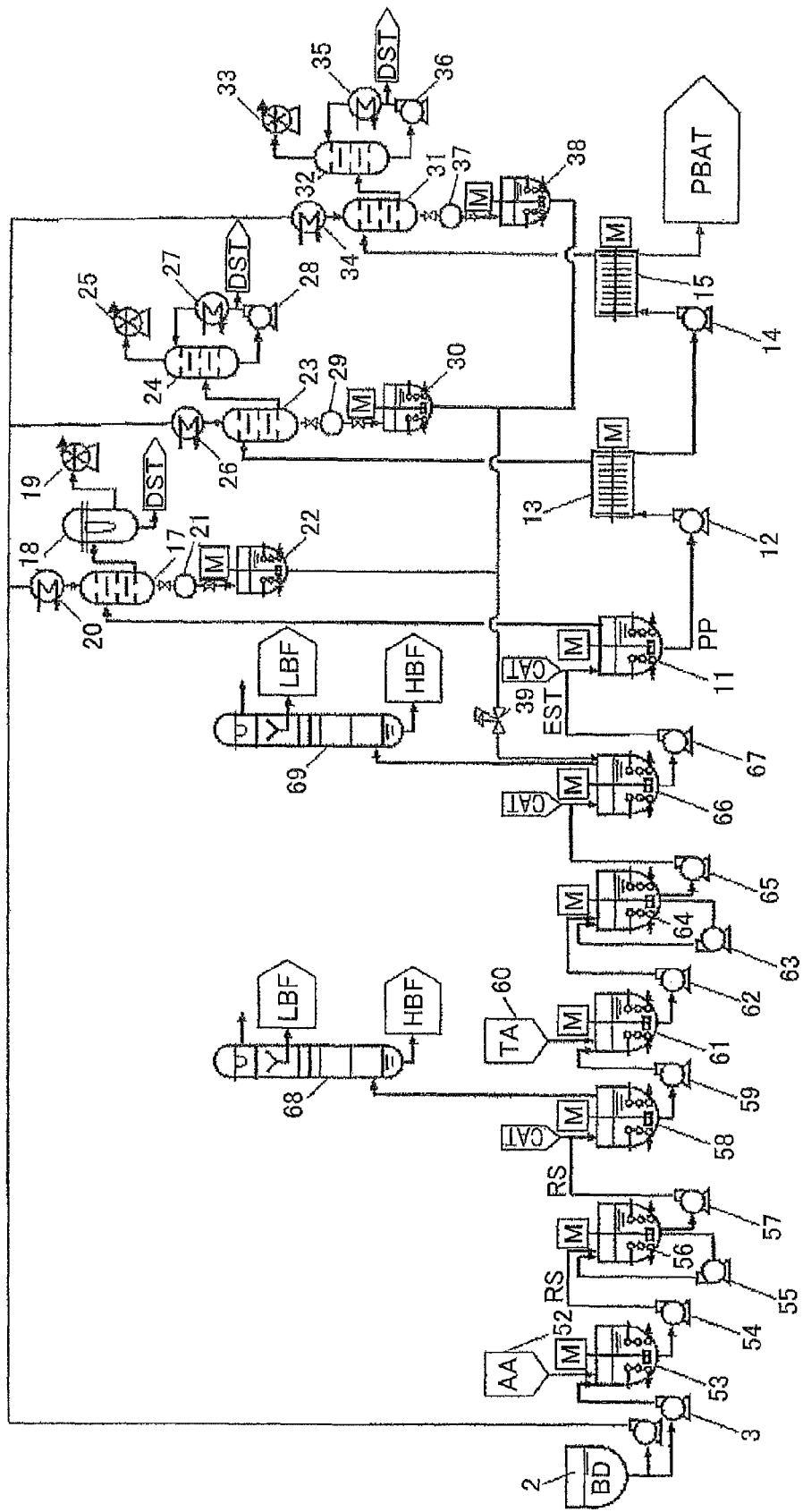
FIG. 9 illustrates a device for producing a polyester according to an embodiment of the present invention.

FIG. 9 illustrates a device for producing a polyester according to another embodiment of the present invention. Here, an embodiment in which poly(butylene adipate/terephthalate) is produced by this device will be described for convenience.

The device shown in FIG. 9 can be used to carry out a method for producing poly(butylene adipate/terephthalate) according to an embodiment of the present invention. Note that the present invention is not limited to this device, and another device may be used in a range without departing from the scope of the present invention.

A device according to the present embodiment includes: an adipic acid supplier 52; the 1,4-butanediol supplier 2; a preparation tank 53 for starting material slurry; a storage tank 56 for starting material slurry; a liquid transfer unit 55; a first esterification reactor 58; a terephthalic acid supplier 60; a preparation tank 61 for intermediate slurry; a storage tank 64 for intermediate slurry; a liquid transfer unit 63; a second esterification reactor 66; the initial polycondensation reactor 11; the middle polycondensation reactor 13; and the final polycondensation reactor 15.

In the preparation tank 53 for starting material slurry, adipic acid and 1,4-butanediol respectively supplied from the adipic acid supplier 52 and the 1,4-butanediol supplier 2 are mixed to prepare starting material slurry. In the present invention, a small amount of a dicarboxylic acid other than adipic acid may be supplied to the preparation tank 53 for starting material slurry. Examples of the dicarboxylic acid other than adipic acid include an oxycarbonic acid such as malic acid. A supplied amount of the dicarboxylic acid other than adipic acid is from about 0.075 mol % to 0.125 mol % per adipic acid and preferably about 0.1 mol %.

Here, a supplied amount of 1,4-butanediol varies depending on physical properties of the desired poly(butylene adipate/terephthalate). Generally, a total of the supplied amounts thereof used in the first and second esterification steps is usually from about 1.02 mol to 1.5 mol per 1 mol of a total of adipic acid and terephthalic acid, and preferably from about 1.03 mol to 1.2 mol. In order to give fluidity to the starting material slurry, the preparation tank 53 may be heated. The heating temperature is set in a range from 25° C. to 150° C. and preferably from 50° C. to 100° C.

The storage tank 56 stores the starting material slurry supplied from the preparation tank 53, and the starting material slurry is then supplied to the first esterification reactor 58. In order to give fluidity to the starting material slurry, the storage tank 56 may be heated. The heating temperature is set in a range from 25° C. to 150° C. and preferably from 50° C. to 100° C. In order to prevent sedimentation of adipic acid contained in the starting material slurry, the storage tank 56 may use the liquid transfer unit 55 installed partway through a circulation line independent from a line that is used to transfer the starting material slurry to the first esterification reactor 58. By doing so, the starting material slurry may be circulated at a flow rate equal to or more than a sedimentation rate of adipic acid. As such a liquid transfer unit, a device usually used in the art can be used. Examples of the liquid transfer unit include a gear pump and a plunger pump or the like.

In the first esterification reactor 58, the starting material slurry supplied from the storage tank 56 is subjected to an esterification reaction at a predetermined temperature and pressure to produce an ester of adipic acid and 1,4-butanediol. A reaction temperature in the first esterification reactor 58 is set in a range from about 140° C. to 230° C. and preferably from about 145° C. to 225° C. The reaction rate is low and impractical, if the reaction temperature is lower than 140° C. The generated ester may be thermally decomposed, if the reaction temperature is higher than 230° C. Regarding the pressure, the reaction is usually carried out at an ordinary pressure, but may be carried out at a negative pressure. In the case of the negative pressure, a degree of vacuum ranges from about 1 Torr to 700 Torr and preferably ranges from about 100 Torr to 700 Torr.

The reactor may be heated by a method usually used in the art. Examples include: a method for providing a heat transfer medium-containing jacket around a periphery of the reactor and heating a reaction solution by heat conducted through a wall of the reactor; and a method for heating the reactor by heat conducted through a heat-transfer pipe (or coil) inside the reactor. Those methods may be used singly or may be combined.

As the first esterification reactor 58, a reaction apparatus usually used for manufacturing a polyester via esterification can be used. Examples of such a reaction apparatus include a vertical type agitation tank having a vertical type rotation shaft with a stirring blade (e.g., a paddle blade, a helical ribbon blade). A distillate discharged from the first esterification reactor 58 may be made to flow into a distillation tower 68 installed over the first esterification reactor 58. Then, 1,4-butanediol contained in a high-boiling-point fraction may be collected to be returned to the preparation tank 53 and recycled.

Figure 10:
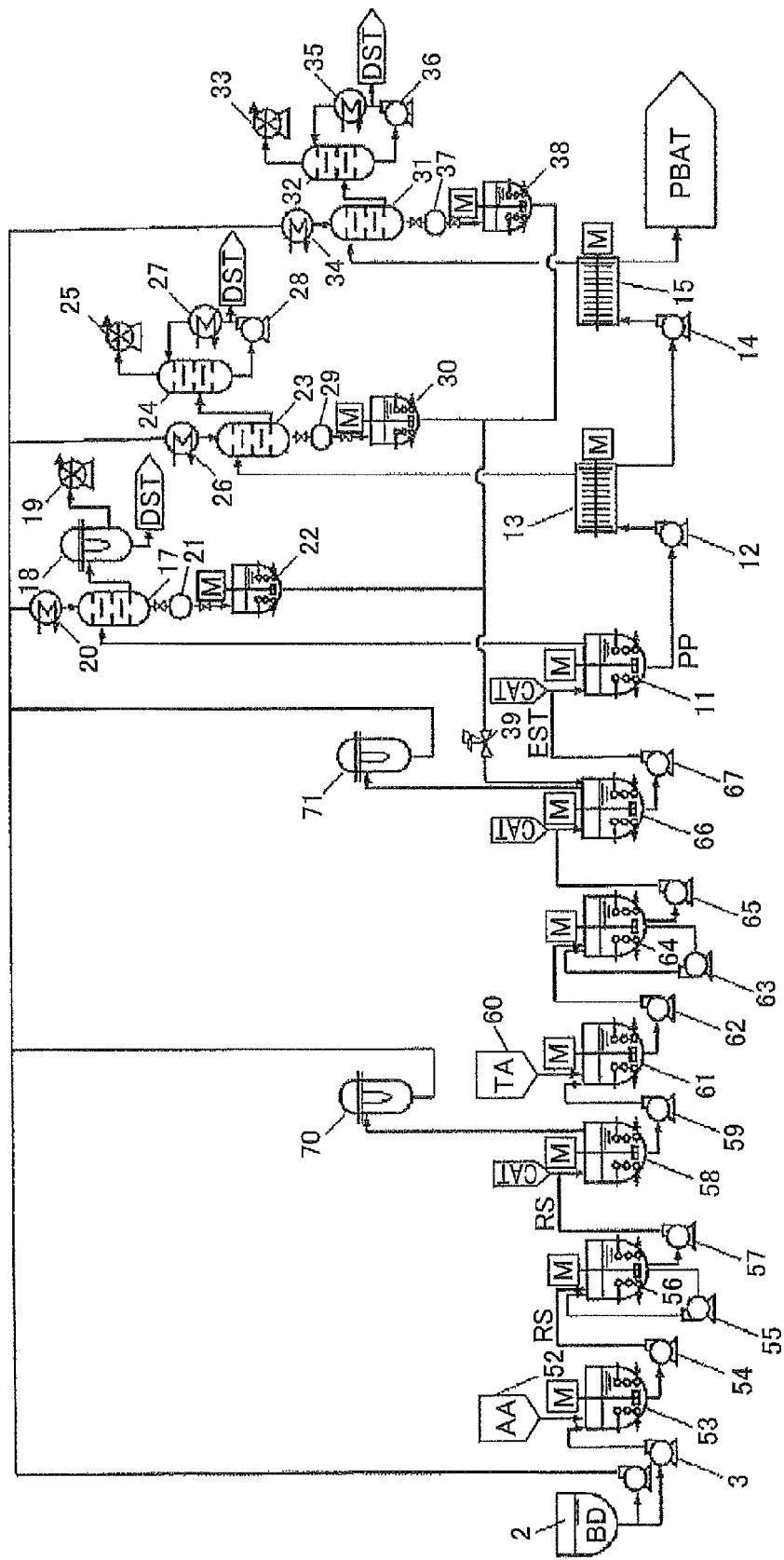
FIG. 10 illustrates a device for producing a polyester according to an embodiment of the present invention.

In addition, water contained in the distillate may be used for hydrolysis of process scattered substances discharged during the polycondensation step. For this purpose, a low-boiling-point fraction discharged from the distillation tower 68 may be made to flow into either of the wet condenser and the hot well or both. Alternatively, as shown in FIG. 10, the distillation tower 68 may be omitted and a condenser 70 may be installed. The distillate may be made to flow into either of the wet condenser and the hot well or both.

In the preparation tank 61 for intermediate slurry, terephthalic acid and the ester of adipic acid and 1,4-butanediol that are supplied from the terephthalic acid supplier 60 and the first esterification reactor 58, respectively, are mixed to prepare intermediate slurry. In the present invention, a small amount of a dicarboxylic acid other than terephthalic acid may be supplied to the preparation tank 61 for intermediate slurry. Examples of the dicarboxylic acid other than terephthalic acid include an oxycarbonic acid such as malic acid.

A supplied amount of the dicarboxylic acid other than terephthalic acid is set in a range from about 0.075 mol % to 0.125 mol % per terephthalic acid and preferably about 0.1 mol %. Also, 1,4-butanediol may be additionally supplied. A supplied amount of 1,4-butanediol varies depending on physical properties of the desired poly(butylene adipate/terephthalate), but a total of the supplied amounts thereof to the first and second esterification steps is usually from about 1.02 mol to 1.5 mol per 1 mol of a total of adipic acid and terephthalic acid and preferable from about 1.03 mol to 1.2 mol. In order to give fluidity to the intermediate slurry, the preparation tank 61 may be heated. The heating temperature is set in a range from 25° C. to 150° C. and preferably from 50° C. to 100° C.

The storage tank 64 stores the intermediate slurry supplied from the preparation tank 61, and the intermediate slurry is then supplied to the second esterification reactor 66. In order to give fluidity to the intermediate slurry, the storage tank 64 may be heated. The heating temperature is set in a range from 25° C. to 150° C. and preferably from 50° C. to 100° C. In order to prevent sedimentation of terephthalic acid contained in the intermediate slurry, the storage tank 64 may use the liquid transfer unit 63 installed partway through a circulation line independent from a line that is used to transfer the intermediate slurry to the second esterification reactor 66. By doing so, the intermediate slurry may be circulated at a flow rate equal to or more than a sedimentation rate of the terephthalic acid. As such a liquid transfer unit, a device usually used in the art can be used. Examples of the liquid transfer unit include a gear pump and a plunger pump.

In the second esterification reactor 66, the intermediate slurry supplied from the storage tank 64 is subjected to an esterification reaction at a predetermined temperature and pressure to produce an ester of terephthalic acid, adipic acid, and 1,4-butanediol. A reaction temperature in the second esterification reactor 66 is set in a range from 140° C. to 250° C. and preferably from about 145° C. to 245° C. The reaction rate is low and impractical, if the reaction temperature is lower than 140° C. The generated ester may be thermally decomposed, if the reaction temperature is higher than 250° C. Regarding the pressure, the reaction is usually carried out at an ordinary pressure, but may be carried out at a negative pressure. In the case of the negative pressure, a degree of vacuum ranges from 1 Torr to 700 Torr and preferably ranges from about 100 Torr to 700 Torr.

The esterification reaction proceeds until an acid value of the ester reaches 30 or less, preferably 15 or less, and more preferably 10 or less. In addition, the esterification reaction can be conducted under the presence of a catalyst. Conventionally known catalysts can be used as the above catalyst. Examples of the catalyst include catalysts made of any of metallic compounds or metals selected from the group consisting of Groups IA, IIIA, IV, IIB, and VA in the periodic table. Among them, preferred are tin-based compounds (e.g., tin octylate) and antimony-based compounds (e.g., antimony trioxide). A usage amount of the catalyst is from 1000 ppm to 3000 ppm per total of adipic acid and terephthalic acid, and preferably from 1500 ppm to 2500 ppm.

The reactor may be heated by a method usually used in the art. Examples include: a method for providing a heat transfer medium-containing jacket around a periphery of the reactor and heating a reaction solution by heat conducted through a wall of the reactor; and a method for heating the reactor by heat conducted through a heat-transfer pipe (or coil) inside the reactor. Those methods may be used singly or may be combined. In the second esterification reactor 66, a reaction apparatus usually used for manufacturing a polyester via esterification can be used. Examples of such a reaction apparatus include a vertical type agitation tank with a vertical type rotation shaft having a stirring blade (e.g., a paddle blade, a helical ribbon blade).

A distillate discharged from the second esterification reactor 66 may be made to flow into a distillation tower 69 installed over the second esterification reactor 66. Then, 1,4-butanediol contained in a high-boiling-point fraction may be collected and returned to the preparation tanks 53 and/or 61, etc., to be recycled. Alternatively, the distillate may be made to flow into the distillation tower 68 installed over the first esterification reactor 58. In addition, water contained in the distillate may be used for hydrolysis of process scattered substances discharged during the polycondensation step. For this purpose, a low-boiling-point fraction discharged from the distillation tower 69 may be made to flow into either of the wet condenser and the hot well or both. Alternatively, as shown in FIG. 10, the distillation tower 69 may be omitted and a condenser 71 may be installed. The distillate may be made to flow into either of the wet condenser and the hot well or both.

In the initial polycondensation reactor 11, the ester supplied from the second esterification reactor 66 is subjected to a polycondensation reaction at a predetermined temperature and pressure to produce a prepolymer having a terminal hydroxyl group. A reaction temperature in the initial polycondensation reactor 11 is set in a range from 140° C. to 250° C. and preferably from about 145° C. to 245° C. The reaction rate is low and impractical, if the reaction temperature is lower than 140° C. The produced prepolymer may be thermally decomposed, if the reaction temperature is higher than 250° C. Regarding the pressure, the reaction usually conducted at a low pressure (e.g., from about 5 Torr to 200 Torr).

The polycondensation reaction is usually carried out under the presence of a catalyst. Catalysts may be used singly or two or more of them may be combined. Examples of the catalysts that can be used include catalysts widely used for transesterification. Examples of the catalysts include metallic compounds containing a metal (e.g., Li, Mg, Ca, Ba, La, Ce, Ti, Zr, Hf, V, Mn, Fe, Co, Ir, Ni, Zn, Ge, Sn). The examples include: organometallic compounds (e.g., an organic acid salt, metal alkoxide, metal complex (e.g., acetylacetonate)); and inorganometallic compounds (e.g., a metal oxide, metal hydroxide, metal carbonate, metal phosphate, metal sulfate, metal nitrate, metal chloride). Among the metallic compound catalysts, preferred is a titanium compound. More preferred is an organic titanium compound (e.g., titanium tetraethoxide, titanium tetraisopropoxide, titanium tetrabutoxide). A usage amount of the metallic compound catalyst is from about 0.005 mol to 1 mol per 100 mol of the ester, and preferably from about 0.01 mol to 0.3 mol.

The initial polycondensation reactor 11 may be heated by a method usually used in the art. Examples include: a method for providing a heat transfer medium-containing jacket around a periphery of the reactor and heating a reaction solution by heat conducted through a wall of the reactor; and a method for heating the reactor by heat conducted through a heat-transfer pipe (or coil) inside the reactor. Those methods may be used singly or may be combined.

In the initial polycondensation reactor 11, a reaction apparatus usually used for manufacturing a polyester via esterification can be used. Examples of such a reaction apparatus include a vertical type agitation tank with a vertical type rotation shaft having a stirring blade (e.g., a paddle blade, a helical ribbon blade).

In the middle polycondensation reactor 13, the prepolymer supplied from the initial polycondensation reactor 11 is subjected to a polycondensation reaction at a predetermined temperature and pressure to generate poly(butylene adipate/terephthalate). A reaction temperature in the middle polycondensation reactor 13 is set in a range from 235° C. to 245° C. and preferably 240° C. The reaction rate is low and impractical, if the reaction temperature is lower than 235° C. In addition, the generated poly(butylene adipate/terephthalate) may be thermally decomposed, if the reaction temperature is higher than 245° C. A reaction time ranges from 0.75 hour to 1.25 hours and is preferably 1 hour. A pressure ranges from 3 Torr to 5 Torr and is preferably 4 Torr.

The middle polycondensation reactor 13 includes: at least one reactor; a prepolymer inlet; and a poly(butylene adipate/terephthalate) outlet. In addition, the reactor further includes an ordinary thermometer. Examples of the middle polycondensation reactor 13 that can be used include, but are not particularly limited to, a vertical type reactor, a horizontal type reactor, and a tank type reactor. Two or more reactors may be arranged in series or only one reactor may be used. Examples of the stirring blade that can be used include a grid blade, wheel blade, glasses blade, hybrid blade, paddle blade, turbine blade, anchor blade, double motion blade, and helical ribbon blade.

The middle polycondensation reactor 13 may be heated by a method usually used in the art. Examples include: a method for providing a heat transfer medium-containing jacket around a periphery of the reactor and heating a reaction solution by heat conducted through a wall of the reactor; and a method for heating the reactor by heat conducted through a heat-transfer pipe (or coil) inside the reactor. Those methods may be used singly or may be combined.

In the final polycondensation reactor 15, the poly(butylene adipate/terephthalate) supplied from the middle polycondensation reactor 13 is subjected to a polycondensation reaction at a predetermined temperature and pressure to increase a molecular weight of the poly(butylene adipate/terephthalate). A reaction temperature in the final polycondensation reactor 15 is set in a range from 235° C. to 255° C. and preferably about 240° C. A reaction rate is low and impractical, if the reaction temperature is 235° C. or lower, that is, lower than the temperature in the intermediate polycondensation step. In addition, the poly(butylene adipate/terephthalate) may be thermally decomposed, if the reaction temperature is higher than 255° C. A pressure ranges from 0.5 Torr to 1.5 Torr and is preferably 1 Torr.

The final polycondensation reactor 15 includes: at least one reactor; a poly(butylene adipate/terephthalate) inlet; and a poly(butylene adipate/terephthalate) outlet. In addition, the reactor further includes an ordinary thermometer. Examples of the reactor that can be used include, but are not particularly limited to, a vertical type reactor, a horizontal type reactor, and a tank type reactor. Two or more reactors may be arranged in series or only one reactor may be used. Examples of the stirring blade that can be used include a grid blade, wheel blade, glasses blade, hybrid blade, paddle blade, turbine blade, anchor blade, double motion blade, and helical ribbon blade.

The final polycondensation reactor 15 may be heated by a method usually used in the art. Examples include: a method for providing a heat transfer medium-containing jacket around a periphery of the reactor and heating a reaction solution by heat conducted through a wall of the reactor; and a method for heating the reactor by heat conducted through a heat-transfer pipe (coil) inside the reactor. Those methods may be used singly or may be combined.

Exhaust discharged from the initial polycondensation reactor 11, the middle polycondensation reactor 13, and the final polycondensation reactor contains process scattered substances containing, for example, 1,4-butanediol, a low-molecular-weight oligomer, water, and tetrahydrofuran (THF). The exhaust containing the process scattered substances is introduced into a wet condenser.

The exhaust systems for the initial polycondensation reactor 11, the middle polycondensation reactor 13, and the final polycondensation reactor 15 are connected to the wet condensers 17, 23, and 31, respectively. Exhaust discharged from each polycondensation reactor or each indirect heat exchanger is introduced into each wet condenser. As used herein, a term of "wet condenser" means a condenser in which a flowing coolant directly contacts with flowing gas. Exhaust discharged from the initial polycondensation reactor 11, the middle polycondensation reactor 13, and the final polycondensation reactor 15 contains process scattered substances containing, for example, 1,4-butanediol, a cyclic oligomer-containing oligomer, water, and tetrahydrofuran (THF). In each wet condenser, those process scattered substances contained in the exhaust are collected and transferred to the below-described hot well.

Figure 11:
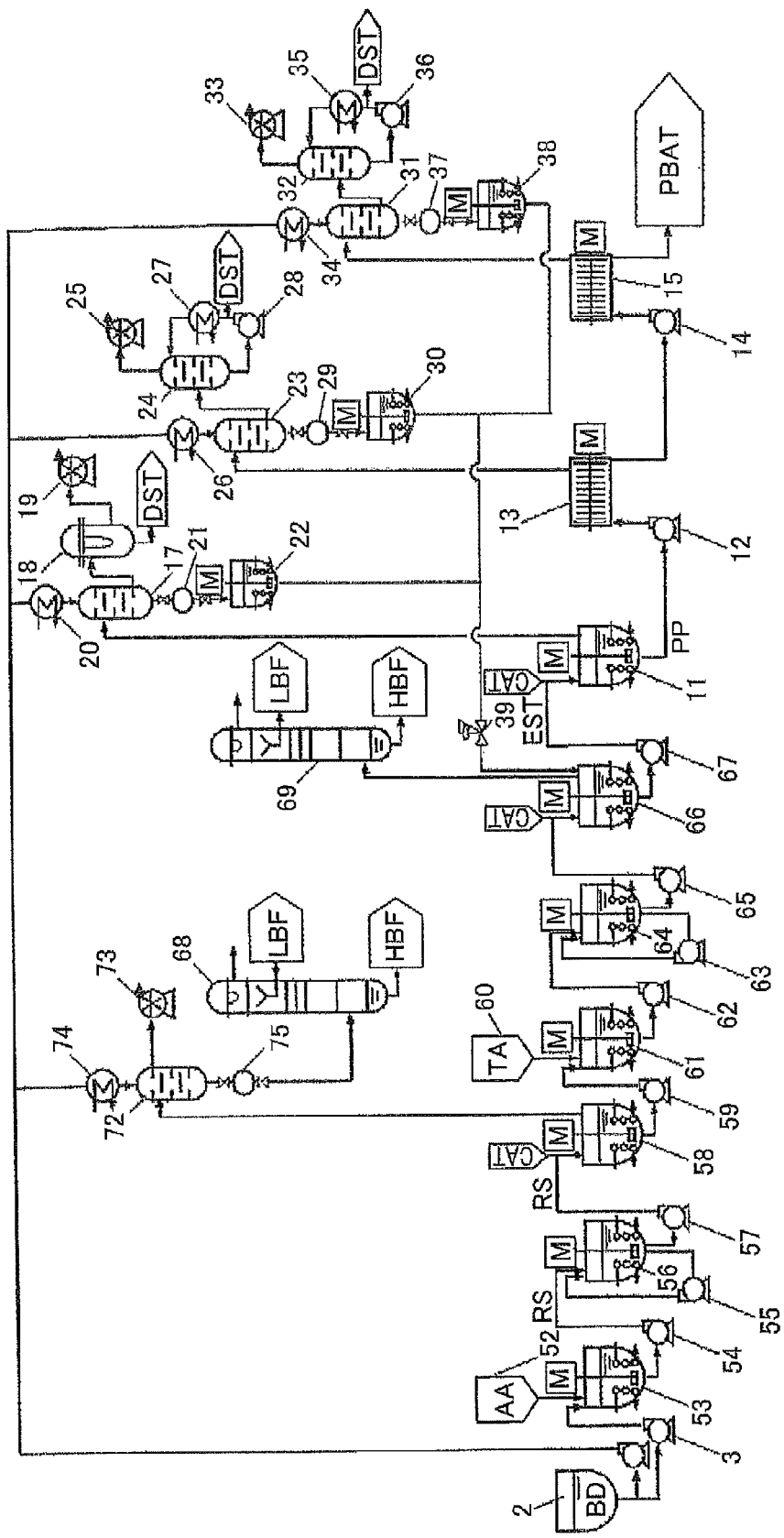
FIG. 11 illustrates a device for producing a polyester according to an embodiment of the present invention.
Figure 12:
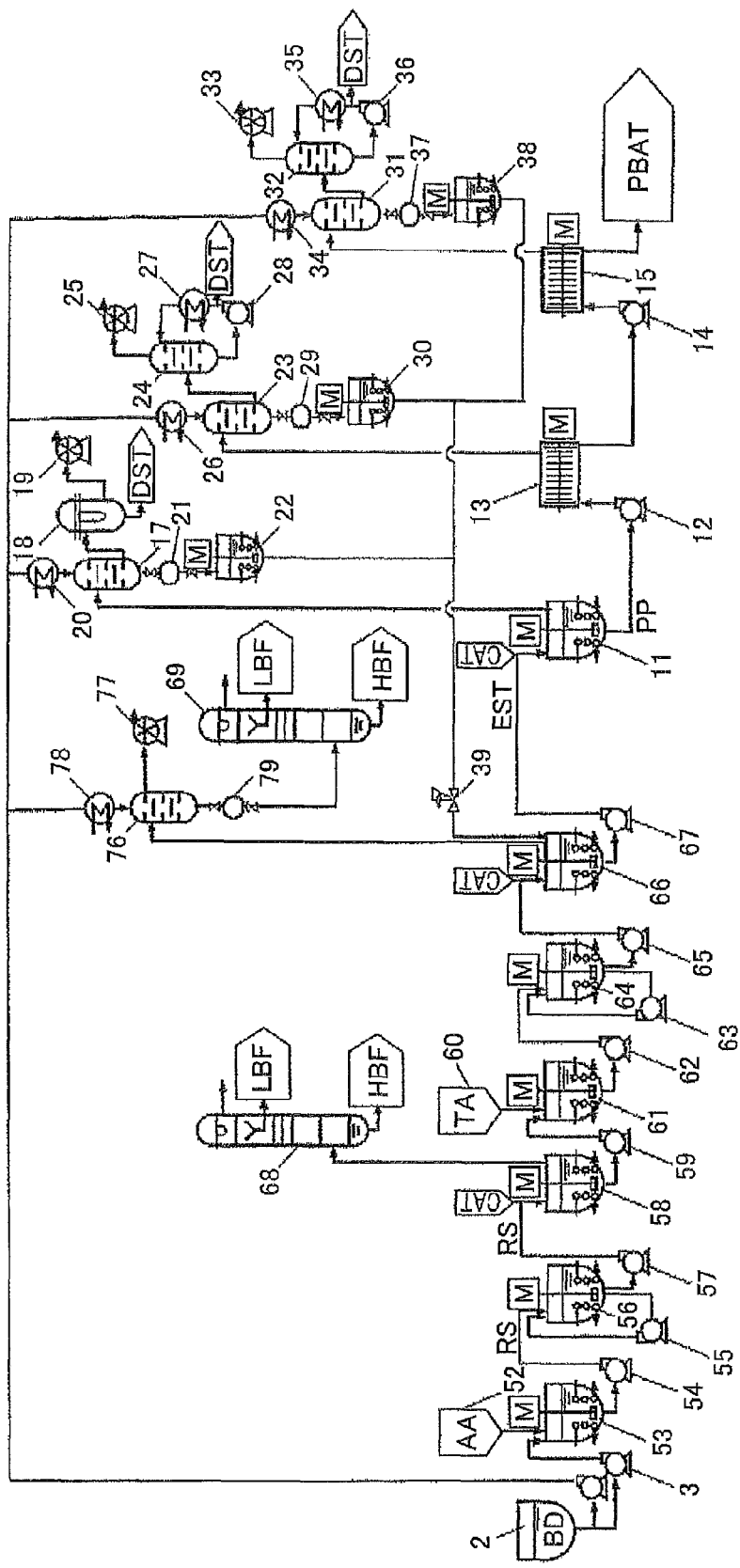
FIG. 12 illustrates a device for producing a polyester according to an embodiment of the present invention.
Figure 13:
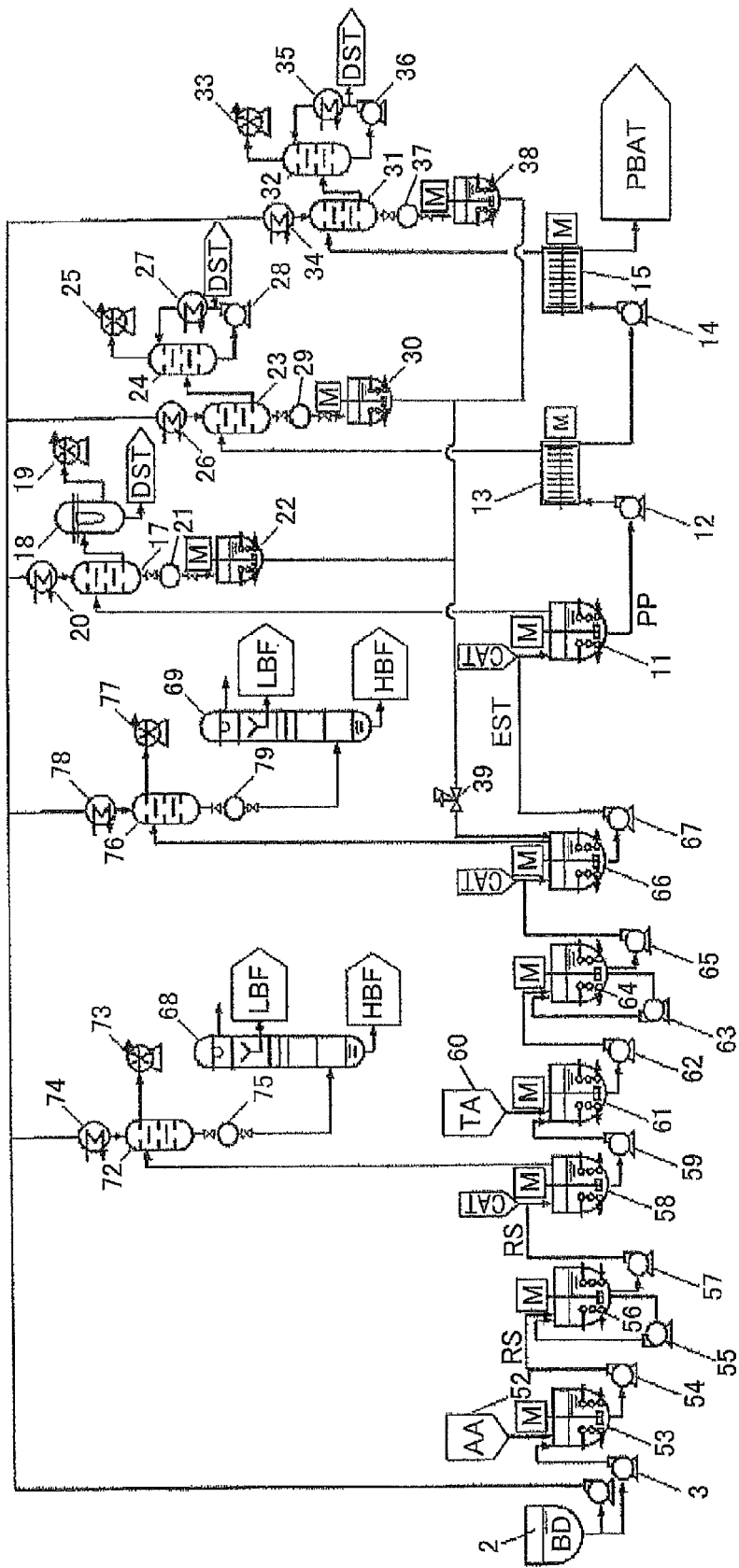
FIG. 13 illustrates a device for producing a polyester according to an embodiment of the present invention.

Next, the cyclic oligomer is hydrolyzed into a linear oligomer. Also, the high-molecular-weight oligomer is hydrolyzed into low-molecular-weight oligomers. Those oligomers are transferred to the second esterification reactor 66 and are recycled as a starting material. The device shown in FIG. 10 includes wet condensers corresponding to the initial polycondensation reactor 11, the middle polycondensation reactor 13, and the final polycondensation reactor 15. However, embodiments are not limited to the present embodiment. When the first esterification reactor 58 is depressurized, the first esterification reactor 58 may be connected to a wet condenser 72 as shown in FIG. 11. When the second esterification reactor 66 is depressurized, the second esterification reactor 66 may be connected to a wet condenser 76 as shown in FIG. 12. When both the reactors are depressurized, both exhaust systems may have respective wet condensers 72 and 76 as shown in FIG. 13.

In each wet condenser, a liquid containing 1,4-butanediol is used as a coolant. As the coolant, the starting material 1,4-butanediol may be used, or a liquid containing 1,4-butanediol and water collected in the exhaust system in the esterification step may be used. In each wet condenser, the coolant whose temperature is adjusted using the indirect heat exchanger 20, 26, or 34 is made to circulate. By doing so, the process scattered substances contained in the exhaust are collected and dissolved. A temperature of the temperature-controlled coolant is set in a range from 20° C. to 100° C., which are equal to or higher than the melting point of 1,4-butanediol, and preferably from about 50° C. to 90° C.

Examples of the wet condenser according to the present invention include a stage-type wet condenser in which one or more stages are provided; a liquid used as a coolant containing 1,4-butanediol is made to circulate and flow downward from an upper portion of the one or more stages to generate a liquid film; and contact of the liquid film with exhaust enables process scattered substances to be dissolved and collected. Another example is a shower-type wet condenser in which a shower nozzle is disposed at an upper portion of the condenser; a liquid used as a coolant containing 1-4-butanediol is sprayed; and contact of the resulting liquid drops with exhaust enables process scattered substances to be dissolved and collected. Still another example is a wet condenser configured by combining a stage-type condenser disposed at an upper portion of the wet condenser and a shower-type condenser disposed at a lower portion of the wet condenser. Herein, any of the above wet condensers may be used.

FIG. 4 outlines the shower-type wet condenser. FIG. 5 outlines the stage-type wet condenser. FIG. 6 outlines the wet condenser in which a stage-type condenser and a shower-type condenser are combined. The wet condensers shown in FIGS. 4 to 6 include: a main body 101 of wet condenser; a gas inlet pipe 102; an exhaust pipe 103 for non-condensed gas; a coolant supply pipe 104; a condensate discharging pipe 105; a coolant shower nozzle 106; a coolant supply nozzle 107; and a stage 108.

Further, an additional condenser that collects and liquefies THF and water, etc., discharged from each wet condenser may be disposed downstream of each wet condenser.

Each of the wet condensers 17, 23, or 31 is connected to each of the hot wells 22, 30, or 38 into which a drain liquid discharged from each wet condenser is introduced. The drain liquid contains the collected and dissolved process scattered sub stances and the liquid containing 1,4-butanediol used as a coolant. Examples of the above hot well that can be used include, but are not limited to, a tank-type hot well. In addition, over the hot well may be disposed a return condenser that liquefies 1,4-butanediol evaporated in the hot well and returns the liquefied 1,4-butanediol to the hot well. In addition, a condenser that liquefies and collects water and THF evaporated in the hot well may be arranged. The hot well has at least one stirring or heating unit, which can promote hydrolysis of process scattered substances contained in the drain liquid.

The cyclic oligomer and/or the high-molecular-weight oligomer contained in the process scattered substances are hydrolyzed to produce linear low-molecular-weight oligomers via consuming water contained in the drain liquid. In addition, the drain liquid of which water content is decreased is returned to the esterification step, which may suppress catalyst deterioration due to decreased water content. More preferably, water may be removed from the drain liquid at the hot well or downstream thereof. The hot well may be kept at an ordinary pressure or a negative pressure so as to promote water evaporation. However, it should be noted that 1,4-butanediol and/or the oligomers are volatilized at a highly vacuumed condition with a degree of vacuum of 1 Torr or less. Accordingly, a pressure in the hot well is set in a range from 1 Torr to 760 Torr and preferably from 100 Torr to 760 Torr.

Figure 14:
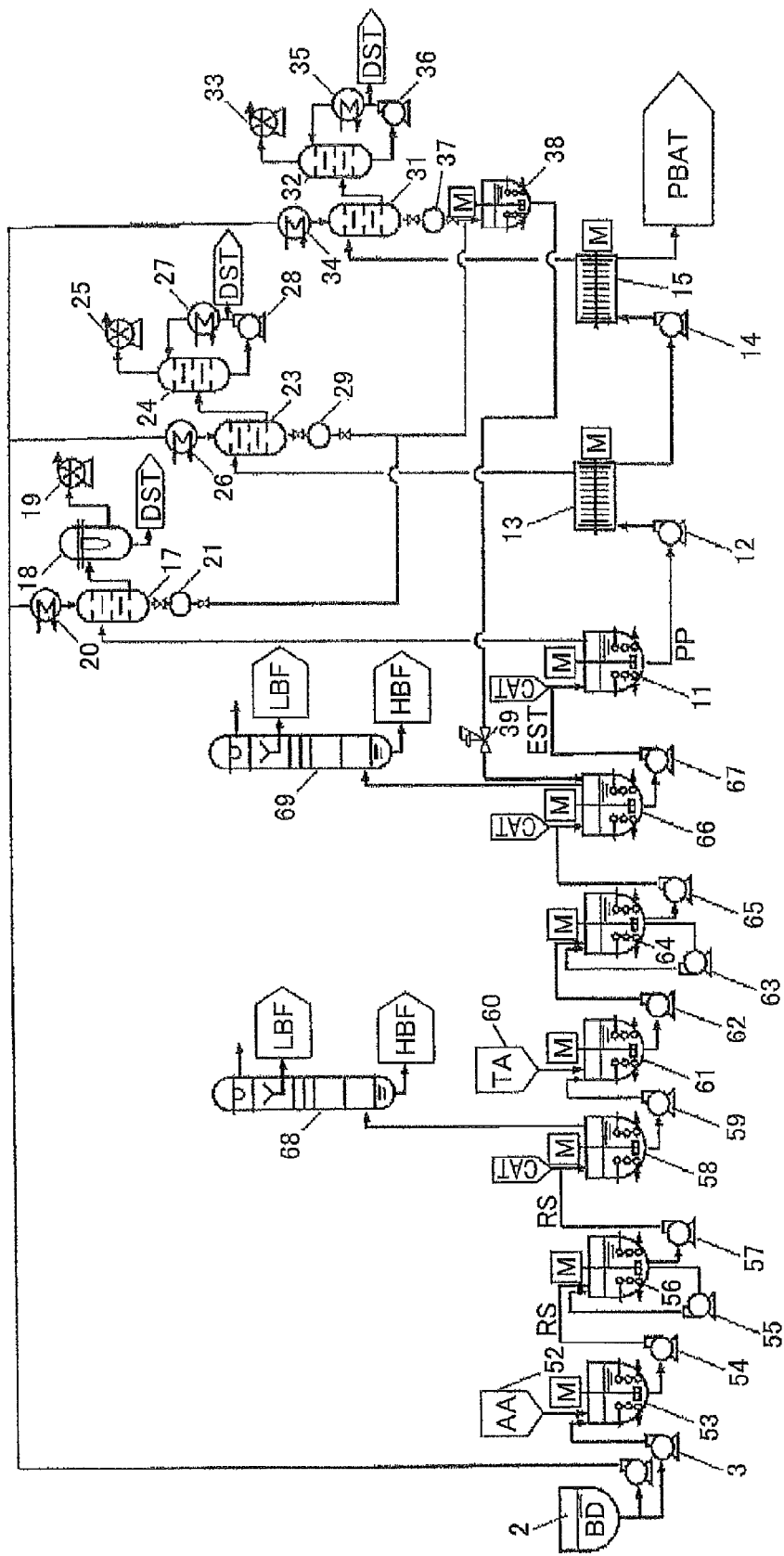
FIG. 14 illustrates a device for producing a polyester according to an embodiment of the present invention.

A heating temperature in the hot well is set in a range from 20° C. to 200° C. and preferably from 50° C. to 150° C. A retention time in the hot well is set in a range from 1 min to 10 hours and preferably from 3 min to 1 hour. In addition, as illustrated in FIG. 14, the drain liquid discharged from each of the wet condensers 17, 23, or 31 may be introduced in one hot well 38. Further, when the process scattered substances are insufficiently hydrolyzed in the hot well, a suitable amount of water may be added to the hot well. The drain liquid whose contents have been hydrolyzed in the hot well is transferred to the second esterification reactor 66.

The construction of combining the wet condenser that uses a liquid containing 1,4-butanediol as a coolant and the hot well has the following advantages when compared to a conventional combination of a condenser and an ejector using 1,4-butanediol. That is, water content contained in the drain liquid is consumed by hydrolysis. Also, the cyclic oligomer and the high-molecular-weight oligomer, which are hardly subjected to a polycondensation reaction, contained in the process scattered substances are hydrolyzed to produce fresh low-molecular-weight oligomers. The resulting oligomers can be recycled to increase a production yield based on the starting material. This advantage leads to an improved synthetic efficiency in the entire process and a reduced running cost.

Further, water contained in the drain liquid that is returned to the esterification step, can be decreased or removed. This makes it possible to suppress deterioration of the catalyst in the esterification step. The above advantages lead to decrease in the catalyst usage, and improvement in a thermal stability of the polymer. Moreover, the process scattered substances are washed away by using a liquid containing 1,4-butanediol. Hence, the process scattered substances neither infiltrate into a unit (e.g., a vacuum pump) installed downstream of the wet condenser, nor deteriorate the unit.

EXAMPLES

Example 1

The device shown in FIG. 1 was used to produce polybutylene succinate.

In the preparation tank 4 for starting material slurry, succinic acid and 1,4-butanediol respectively supplied from the succinic acid supplier 1 and the 1,4-butanediol supplier 2 were mixed to prepare starting material slurry. Here, 1,4-butanediol were mixed with the succinic acid at a mol ratio of 1.3:1. A heating temperature in the preparation tank 4 was set to 80° C. In addition, 0.1 mol % of malic acid per succinic acid was added as an additive.

In the storage tank 6 for starting material slurry, the liquid transfer unit 8 was used to circulate the starting material slurry at a flow rate equal to or more than a sedimentation rate of succinic acid. The sedimentation rate of succinic acid was 0.00015 m/s. By contrast, a circulation rate of the starting material slurry was set to 0.004 m/s. The heating temperature in the storage tank 6 was set to 80° C.

In the esterification reactor 9, the starting material slurry supplied from the storage tank 6 was subjected to an esterification reaction at 230° C. to produce an ester of succinic acid and 1,4-butanediol.

In the initial polycondensation reactor 11, titanium tetrabutoxide (2000 ppm) was added as a catalyst to the ester supplied from the esterification reactor 9. The resulting mixture was subjected to polycondensation at 230° C. and 20 Torr to prepare a prepolymer.

In the middle polycondensation reactor 13, the prepolymer supplied from the initial polycondensation reactor 11 was subjected to polycondensation at an agitation rate of 3 rpm, at 240° C. and 4 Torr for 1.5 hours. In the final polycondensation reactor 15, polybutylene succinate supplied from the middle polycondensation reactor 13 was subjected to polycondensation at an agitation rate of 1 rpm, at 250° C. and 1 Torr. Hereby, polybutylene succinate was prepared.

In the exhaust system of each polycondensation reactor, a coolant temperature of the wet condenser was set at 80° C. A heating temperature of the hot well was set at 100° C. A retention time thereof was set for 5 min. Under the above conditions, process scattered substances were collected and decomposed, and the resulting drain liquid was returned to the esterification step.

As a result, polybutylene succinate thus synthesized for 12 hours of the total reaction time of the polycondensation had a weight-average molecular weight of 140000. A yield of polybutylene succinate was 75% based on the starting material.

Example 2

The device shown in FIG. 9 was used to produce poly (butylene adipate/terephthalate).

In the preparation tank 53 for starting material slurry, adipic acid and 1,4-butanediol that were supplied from the adipic acid supplier 52 and the 1,4-butanediol supplier 2, respectively, were mixed to prepare starting material slurry. Here, 1,4-butanediol and adipic acid were mixed at a mol ratio of 1.3:1. The heating temperature was set at 80° C.

In the first esterification reactor 58, the starting material slurry supplied from the storage tank 56 was subjected to an esterification reaction at 210° C. to generate an ester of adipic acid and 1,4-butanediol.

In the preparation tank 61 for intermediate slurry, terephthalic acid and the ester of adipic acid and 1,4-butanediol that were supplied from the terephthalic acid supplier 60 and the first esterification reactor 58, respectively, were mixed to prepare intermediate slurry. Here, 1.3 mol of the ester of 1,4-butanediol per 1 mol of terephthalic acid was mixed. The heating temperature was set at 80° C.

In the second esterification reactor 66, the intermediate slurry supplied from the storage tank 64 was subjected to an esterification reaction at 240° C. to produce an ester of 1,4-butanediol and adipic and terephthalic acids.

In the initial polycondensation reactor 11, titanium tetrabutoxide (2000 ppm) was added as a catalyst to the ester supplied from the second esterification reactor 66. The resulting mixture was subjected to polycondensation at 240° C. and 20 Torr to prepare a prepolymer.

In the middle polycondensation reactor 13, the prepolymer supplied from the initial polycondensation reactor 11 was subjected to polycondensation at an agitation rate of 3 rpm and at 240° C. and 4 Torr for 1 hour. In the final polycondensation reactor 15, polybutylene succinate supplied from the middle polycondensation reactor 13 was subjected to polycondensation at an agitation rate of 1 rpm and at 240° C. and 1 Torr. Then, final poly(butylene adipate/terephthalate) was prepared.

In the exhaust system of each polycondensation reactor, the wet condenser had a coolant temperature of 80° C. The hot well had a heating temperature of 100° C. The retention time was 5 min. Under those conditions, process scattered substances were collected and hydrolyzed, and were then returned to the esterification step.

As a result, poly(butylene adipate/terephthalate) that had been prepared for 2 hours of the total reaction time of polycondensation had a weight-average molecular weight of 130000. A yield thereof was 75% based on the starting material.

Comparative Example 1

Patent Literature 1 discloses a device including an ejector using 1,4-butanediol and a condenser disposed at a downstream of the ejector. This device and substantially the same process as in Example 1 were used to produce polybutylene succinate. The polybutylene succinate thus produced after 16.5 hours of the polycondensation had a weight-average molecular weight of 140000. A yield thereof was 65% based on the starting material.

Comparative Example 2

Patent Literature 1 discloses a device including an ejector using 1,4-butanediol and a condenser disposed at a downstream of the ejector. This device and substantially the same process as in Example 2 were used to produce poly(butylene adipate/terephthalate). The resulting poly(butylene adipate/terephthalate) had a weight-average molecular weight of 130000. A yield thereof was 65% based on the starting material.

Note that the present invention is not limited to the above embodiments and includes various modifications. For example, another component may be added to the embodiment configuration and/or a part of the embodiment configuration may be deleted or replaced by another component.

LIST OF REFERENCE SIGNS

1: Succinic acid supplier
2: 1,4-Butanediol supplier
3: Liquid transfer unit
4: Preparation tank for starting material slurry
5: Liquid transfer unit
6: Storage tank for starting material slurry
7: Liquid transfer unit
8: Liquid transfer unit
9: Esterification reactor
10: Liquid transfer unit
11: Initial condensation polymerization reactor
12: Liquid transfer unit
13: Middle polycondensation reactor
14: Liquid transfer unit
15: Final polycondensation reactor
16: Distillation tower
17: Wet condenser
18: Condenser
19: Pressure-reducing unit
20: Heat exchanger
21: Catch pot
22: Hot well
23: Wet condenser
24: Condenser
25: Pressure-reducing unit
26: Heat exchanger
27: Heat exchanger
28: Liquid transfer unit
29: Catch pot
30: Hot well
31: Wet condenser
32: Condenser
33: Pressure-reducing unit
34: Heat exchanger
35: Heat exchanger
36: Liquid transfer unit
37: Catch pot
38: Hot well
39: Pressure controller
41: Condenser
46: Drain liquid tank
47: Condenser
48: Drain liquid tank
49: Condenser
50: Drain liquid tank
51: Condenser
52: Adipic acid supplier
53: Preparation tank for starting material slurry
54: Liquid transfer unit
55: Liquid transfer unit
56: Storage tank for starting material slurry
57: Liquid transfer unit
58: First esterification reactor
59: Liquid transfer unit
60: Terephthalic acid supplier
61: Preparation tank for intermediate slurry 62: Liquid transfer unit
63: Liquid transfer unit
64: Storage tank for intermediate slurry
65: Liquid transfer unit
66: Second esterification reactor
67: Liquid transfer unit
68: Distillation tower
69: Distillation tower
70: Condenser
71: Condenser
72: Wet condenser
73: Pressure-reducing unit
74: Heat exchanger
75: Catch pot
76: Wet condenser
77: Pressure-reducing unit
78: Heat exchanger
79: Catch pot
101: Main body of wet condenser
102: Gas inlet pipe
103: Exhaust pipe for non-condensed gas
104: Coolant supply pipe
105: Condensate discharging pipe
106: Coolant shower nozzle
107: Coolant supply nozzle
108: Stage
AA: Adipic acid
BD: 1,4-Butanediol
CAT: Catalyst
DST: Distillate
EST: Ester
HBF: High-boiling-point fraction
LBF: Low-boiling-point fraction
M: Motor
PBAT: Poly(butylene adipate/terephthalate)
PP: Prepolymer
PS: Polybutylene succinate
RS: Starting (Raw) material slurry
SA: Succinic acid
TA: Terephthalic acid

The invention claimed is:

1. A device for producing a polyester obtained from 1,4-butanediol as a starting material, the device comprising:
    an esterification reactor for producing an ester of 1,4-butanediol;
    a polycondensation reactor connected to the esterification reactor; and
    an exhaust system for the polycondensation reactor,
    the exhaust system comprising:
        a wet condenser adapted for providing a coolant containing 1,4-butanediol and being kept from 20° C. to 100° C.; and
        a hot well adapted for keeping its liquid temperature at from 20° C. to 100° C., connected to the wet condenser and configured so that process scattered substances contained in exhaust are hydrolyzed in the hot well.

2. The device for producing a polyester according to claim 1, wherein the hot well is connected to the esterification reactor.

3. The device for producing a polyester according to claim 2, further comprising a warmed pipe for connecting the hot well to the esterification reactor.

4. The device for producing a polyester according to claim 1, wherein the coolant introduced into the wet condenser is heated.

5. The device for producing a polyester according to claim 1, wherein the polyester is polybutylene succinate.

6. The device for producing a polyester according to claim 1, wherein the polyester is polybutylene terephthalate.

7. The device for producing a polyester according to claim 1, wherein the polyester is poly(butylene adipate/terephthalate).

8. A method for producing a polyester from 1,4-butanediol as a starting material, comprising:
    an esterification step of producing an ester of 1,4-butanediol; and
    a polycondensation step of subjecting the produced ester to polycondensation,
    wherein exhaust obtained through the polycondensation step is introduced into a wet condenser that comprises a coolant containing 1,4-butanediol and being kept from 20° C. to 100° C.; and into a hot well whose liquid temperature is kept from 20° C. to 100° C. and connected to the wet condenser, so that process scattered substances contained in the exhaust are hydrolyzed in the hot well.

9. The method for producing a polyester according to claim 8, wherein the process scattered substances contained in the exhaust that have been hydrolyzed in the hot well are sent to the esterification step to be recycled as a starting material.

10. The method for producing a polyester according to claim 9, wherein a warmed pipe is used to transfer the hydrolyzed exhaust process scattered substances to the esterification step.

11. The method for producing a polyester according to claim 10, wherein the warmed temperature is set from 20° C. to 100° C.

12. The method for producing a polyester according to claim 8, wherein the coolant injected into the wet condenser is heated.

13. The method for producing a polyester according to claim 8, wherein the polyester is polybutylene succinate.

14. The method for producing a polyester according to claim 8, wherein the polyester is polybutylene terephthalate.

15. The method for producing a polyester according to claim 8, wherein the polyester is poly(butylene adipate/terephthalate).

* * * * *